US012804698B2

(12) United States Patent
Matsumoto et al.

(10) Patent No.: US 12,804,698 B2
(45) Date of Patent: Nov. 17, 2026

(54) WIRELESS COMMUNICATION SYSTEM, WIRELESS COMMUNICATION METHOD, AND NON-TRANSITORY COMPUTER READABLE STORAGE MEDIUM

(71) Applicant: DENSO CORPORATION, Kariya-city (JP)

(72) Inventors: Sho Matsumoto, Kariya-city (JP); Youichi Hayase, Kariya-city (JP); Yuto Honda, Kariya-city (JP); Tadashi Nakashima, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 274 days.

(21) Appl. No.: 18/628,392

(22) Filed: Apr. 5, 2024

(65) Prior Publication Data

US 2025/0016814 A1 Jan. 9, 2025

(30) Foreign Application Priority Data

Jul. 3, 2023 (JP) ................................ 2023-109506

(51) Int. Cl.

*H04W 4/00* (2018.01)
*H04W 16/18* (2009.01)
*H04W 72/542* (2023.01)

(52) U.S. Cl.

CPC ......... *H04W 72/542* (2023.01); *H04W 16/18* (2013.01)

(58) Field of Classification Search

CPC ............... H04W 72/542; H04W 24/02; H04W 72/0453

See application file for complete search history.

(56) References Cited

U.S. PATENT DOCUMENTS 6,122,291 A 9/2000 Robinson et al.
2006/0056492 A1* 3/2006 Honda .................. H04B 1/715 375/132
2006/0089149 A1 4/2006 Kizu et al.
2017/0134882 A1* 5/2017 Kao ................. H04W 72/1215
2018/0183489 A1* 6/2018 Rasmussen ........... H04L 1/0071
2022/0159782 A1* 5/2022 Ouyang ................ H04W 84/20

* cited by examiner

*Primary Examiner* — Shantell L Heiber
(74) *Attorney, Agent, or Firm* — Posz Law Group, PLC

(57) ABSTRACT

A master device repeats transmitting a channel map when determining that sharing of the channel map is succeeded since a reception confirmation signal from the slave device cannot be received normally although the master device transmits the channel map to the slave device. Even though the numerical number of channel map transmissions reaches the first predetermined number of times, when determining that the channel map has never been shared even once, the master device disconnects communication connection with the slave device at a predetermined timing.

12 Claims, 10 Drawing Sheets

WIRELESS COMMUNICATION SYSTEM, WIRELESS COMMUNICATION METHOD, AND NON-TRANSITORY COMPUTER READABLE STORAGE MEDIUM

CROSS REFERENCE TO RELATED APPLICATION

The present application claims the benefit of priority from Japanese Patent Application No. 2023-109506 filed on Jul. 3, 2023. The entire disclosure of the above application is incorporated herein by reference.

TECHNICAL FIELD

The present disclosure relates to a wireless communication system, a wireless communication method, and a non-transitory computer readable storage medium for a wireless communication program, in which a master device performs wireless communication with a slave device via one communication channel that is sequentially selected from a plurality of communication channels.

BACKGROUND

A type of wireless communication system is known, for example, according to a conceivable technique. In the wireless communication system of the conceivable technique, when a packet error occurs in a reception signal of a wireless communication device, and the RSSI value of the wireless signal of the packet is larger than a predetermined threshold Th1, the wireless communication device determines that the reception operation for receiving the packet is a reception error due to interference with other electric waves. Then, the wireless communication device counts the number of receptions and the number of reception errors, and stores the frequency of reception errors due to the interference in each frequency channel (i.e., a value obtained by dividing the number of reception errors by the number of receptions). If the frequency of reception errors exceeds the threshold Th2, the wireless communication device determines that an interference source exists in the frequency channel for which the frequency of reception errors due to the interference exceeds the threshold Th2, and stores the frequency channel as an unusable channel.

SUMMARY

According to an example, a master device may repeat transmitting a channel map when determining that sharing of the channel map is succeeded since a reception confirmation signal from the slave device cannot be received normally although the master device transmits the channel map to the slave device. Even though the numerical number of channel map transmissions reaches the first predetermined number of times, when determining that the channel map has never been shared even once, the master device disconnects communication connection with the slave device at a predetermined timing.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
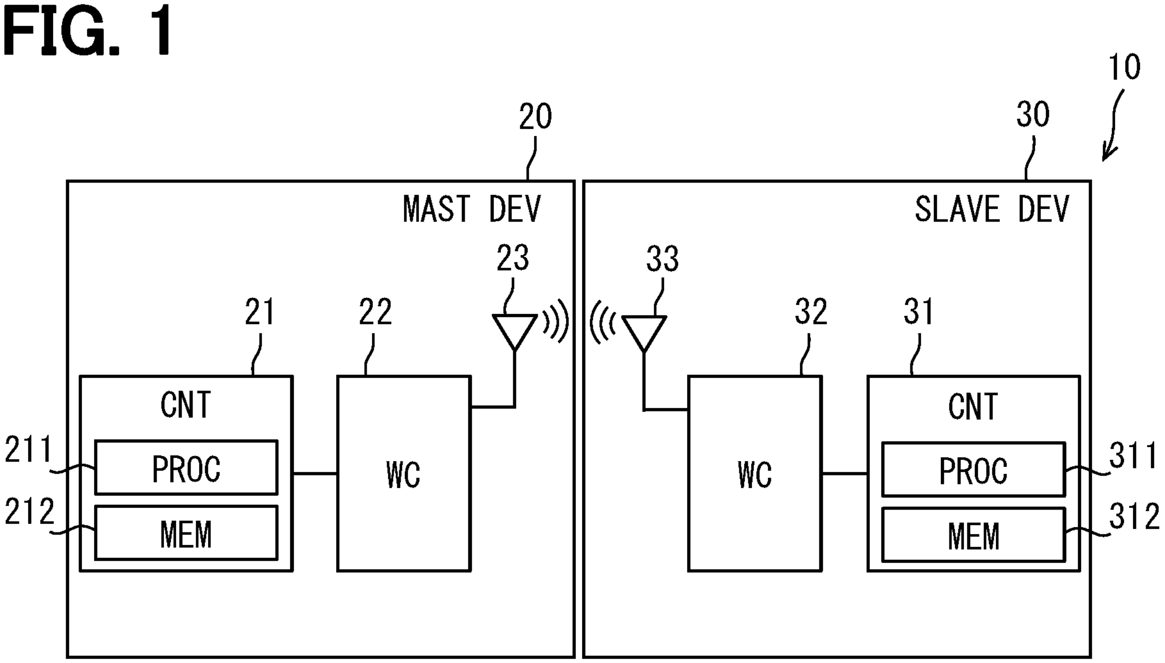
FIG. 1 is a block diagram showing a schematic configuration of a wireless communication system according to a first embodiment.

As described above, in the wireless communication system according to the conceivable technique, a frequency channel whose communication quality has reduced due to interference with other electric waves is set as an unusable channel. Further, in the wireless communication system according to the conceivable technique, a frequency channel that is set as an unusable channel is returned to a usable frequency channel after a predetermined period has elapsed. Such control of setting a frequency channel as an unavailable channel or returning the unavailable channel to an available channel is hereinafter referred to as channel map control in the embodiments.

Here, the master device and the slave device configuring the wireless communication system need to have a common channel map. When the master device and the slave device have a common channel map, it is possible for the master device and the slave device to sequentially select the same communication channel. Here, the channel map indicates a plurality of communication channels that can be used in wireless communication between the master device and the slave device.

When the communication channel used for wireless communication is changed by the channel map control described above, the channel map is also updated. Therefore, the updated channel map needs to be shared between the master device and the slave device, along with information indicating the timing to start using the channel map. Therefore, for example, in response to the updating of the channel map, the master device may transmit information indicating the updated channel map and usage start timing to the slave device. However, if the information indicating the updated channel map and the usage start timing thereof is not normally transmitted from the master device and/or received by the slave device, the channel maps between the master device and the slave device may not match with each other. If the channel maps do not match with each other, the communication channels used for communication may be different from each other so that continuous communication errors occur and communication reliability reduces.

In view of the above described points, the present embodiments provide a wireless communication system, a wireless communication method, and a non-transitory computer readable storage medium for a wireless communication program, and a wireless communication program, which can suppress reduction in communication reliability while performing channel map control.

In order to achieve the above object, in a wireless communication system according to the present embodiments, a master device performs wireless communication with a slave device via one communication channel sequentially selected from a plurality of communication channels.

The wireless communication system includes:

- a quality determination unit that determines a communication quality of each of the communication channels when the master device wirelessly communicates with the slave device;
- a communication channel determination unit that determines the one communication channel to be used for the wireless communication based on a determination result of the communication quality of each of the communication channels by the quality determination unit;
- a channel map share unit that causes the master device to transmit a channel map indicating the one communication channel determined by the communication channel determination unit to the slave device, and causes the master device and the slave device to share the channel map;
- a share determination unit that determines whether or not the channel map is shared between the master device and the slave device based on a reception result of a channel map reception acknowledgement signal transmitted from the slave device in response to receiving the channel map; and
- a communication disconnection unit that disconnects the communication connection with the slave device.

The channel map share unit repeats transmission of the channel map when the share determination unit does not determine that the channel map is shared even though the channel map has been transmitted.

When the share determination unit does not determine that the channel map has been shared even once even though a numerical number of channel map transmissions by the channel map share unit has reached a first predetermined number of times, the communication disconnection unit disconnects the communication connection with the slave device at a predetermined timing.

Further, a wireless communication method according to the present embodiments is a wireless communication method in which a master device performs wireless communication with a slave device via one communication channel that is sequentially selected from a plurality of communication channels.

The wireless communication method includes:

- a quality determination step for determining a communication quality of each of the communication channels when the master device wirelessly communicates with the slave device;
- a communication channel determination step for determining the one communication channel to be used for the wireless communication based on a determination result of the communication quality of each of the communication channels in the quality determination step;
- a channel map share step for causing the master device to transmit a channel map indicating the one communication channel determined in the communication channel determination step to the slave device, and causing the master device and the slave device to share the channel map;
- a share determination step for determining whether or not the channel map is shared between the master device and the slave device based on a reception result of a channel map reception acknowledgement signal transmitted from the slave device in response to receiving the channel map; and
- a communication disconnection step for disconnecting the communication connection with the slave device.

In the channel map share step, transmission of the channel map is repeated when not determining in the share determination step that the channel map is shared even though the channel map has been transmitted.

When not determining in the share determination step that the channel map has been shared even once even though a numerical number of channel map transmissions has reached a first predetermined number of times in the channel map share step, the communication connection is disconnected with the slave device at a predetermined timing in the communication disconnection step.

Further, a wireless communication program according to the present embodiments, which is executed by at least one processor, is a wireless communication program in which a master device performs wireless communication with a slave device via one communication channel that is sequentially selected from a plurality of communication channels.

When executing the wireless communication program, the wireless communication program causes the at least one processor to provide:

- a quality determination function for determining a communication quality of each of the communication channels when the master device wirelessly communicates with the slave device;
- a communication channel determination function for determining the one communication channel to be used for the wireless communication based on a determination result of the communication quality of each of the communication channels by the quality determination function;
- a channel map share function for causing the master device to transmit a channel map indicating the one communication channel determined by the communication channel determination function to the slave device, and causes the master device and the slave device to share the channel map;
- a share determination function that determines whether or not the channel map is shared between the master device and the slave device based on a reception result of a channel map reception acknowledgement signal transmitted from the slave device in response to receiving the channel map; and
- a communication disconnection function for disconnecting the communication connection of the master device with the slave device.

The channel map share function repeats transmission of the channel map when not determining by the share determination function that the channel map is shared even though the channel map has been transmitted.

When not determining by the share determination function that the channel map has been shared even once even though a numerical number of channel map transmissions has reached a first predetermined number of times by the channel map share function, the communication connection is disconnected with the slave device at a predetermined timing by the communication disconnection function.

As described above, in the wireless communication system, the wireless communication method, the non-transitory computer readable storage medium for the wireless communication program and the wireless communication program according to the present disclosure, when it is not determined that the channel map is shared even though the channel map has been transmitted, the channel map is repeatedly transmitted. Therefore, it is possible to increase the possibility that the master device and the slave device share a channel map. Here, even though the numerical number of channel map transmissions reaches the first predetermined number of times, when it is not determined that the channel map has been shared even once, the communication connection with the slave device is disconnected at a predetermined timing. Thereby, it is possible to suppress the occurrence of a situation in which communication errors occur continuously and communication reliability reduces due to differences in channel maps between the master device and the slave device.

The reference signs and/or numerals in parentheses are merely added to indicate examples of correspondence relationships with concrete structures in the below-described embodiments in order to facilitate the understanding of the present disclosure, which has no intention to limit the scope of the present disclosure in any manner.

Hereinafter, preferred embodiments of the present disclosure will be described with reference to the drawings. Note that the same or similar components are denoted by the same reference numerals throughout a plurality of drawings, and description thereof may be omitted. When only a part of a configuration is described in each embodiment, the configurations of other embodiments previously described can be applied to the other parts of the configuration. In addition, not only a combination of configurations explicitly specified in the description of each embodiment but also configurations of a plurality of embodiments can be partially combined even if not explicitly specified as long as there is no problem in the combination.

First Embodiment

A wireless communication system according to the present embodiment includes at least one master device and at least one slave device. At least one of the master device and the slave device may be used while being mounted on a mobile body. The mobile body include, for example, a vehicle such as an automobile and a railroad vehicle, a flying object such as an electric vertical take-off and landing aircraft and a drone, a ship, a construction machine, and a agricultural machine.

As a specific application in vehicles, the wireless communication system according to the present embodiment is applied to a battery management system that manages batteries mounted as battery packs in electrified vehicles, such as, for example, electric vehicles, hybrid vehicles, and plug-in hybrid vehicles and the like. When applied to a battery management system, for example, a master device is connected to a battery control device, and a plurality of slave devices are respectively connected to a monitor device provided in a plurality of battery stacks that constitute a battery pack. In this case, both the master device and the plurality of slave devices are mounted on the vehicle.

Each monitoring device provided for each of the plurality of battery stacks acquires battery information such as the voltage and the current of each battery cell included in the corresponding battery stack and the temperature of the battery stack using various sensors and the like. When each of the monitoring devices receives data requesting the battery information from the battery control device via the wireless communication system, each of the monitoring devices transmits the obtained battery information to the battery control device via the wireless communication system. Based on the obtained battery information, the battery control device calculates the state of charge (i.e., SOC) of the entire battery stack, drives the heating and cooling mechanism to adjust the temperature of the battery pack within an appropriate range, and determines whether or not it is necessary to perform a so-called equalization process to equalize the voltages of the battery cells. When the battery control device determines that it is necessary to perform the equalization process to at least one battery stack, the battery control device instructs the corresponding monitoring device to perform the equalization process via the wireless communication system. In addition, each monitoring device performs processing to determine anomaly in various sensors and anomaly in the operation of the monitoring device, and if an anomaly is determined, the monitoring device transmits anomaly information to the battery control device via the wireless communication system.

Alternatively, the wireless communication system according to this embodiment may be applied to a so-called smart key system or a tire air pressure monitoring system in a vehicle. When applied to a smart key system, for example, a master device is mounted on a vehicle and connected to a control device that controls locking and unlocking of vehicle doors and turning on and off a driving source such as a vehicle engine. At least one slave device is mounted on a mobile key or mobile terminal held by at least one user. When applied to a tire air pressure monitoring system, the master device is mounted on a vehicle and connected to a control device that displays tire air pressure and issues warnings when the tire air pressure is anomaly. The plurality of slave devices are provided within each tire and are connected to an air pressure detection device also provided within each tire.

Furthermore, the wireless communication system according to this embodiment may be applied to a vehicle diagnosis system. In this case, for example, a plurality of slave devices are connected to a plurality of in-vehicle equipment equipped with a self-diagnosis function, and a master device is connected to a diagnostic control device installed at a service factory. In these examples, at least one of the master device and the plurality of slave devices is located at a fixed place, and/or at least one is mounted on a vehicle.

However, application examples of the communication system according to the present embodiment are not limited to vehicles, alternatively, the communication system may be applicable to systems that control and manage various equipment in mobile objects other than vehicles, i.e., objects including aerial object such as drones, ships, construction machinery, agricultural machinery and the like. Furthermore, the communication system according to the present embodiment is also applicable to a system for controlling and managing various types equipment in a structure such as buildings and production facility such as factories.

FIG. 1 is a block diagram showing a schematic configuration of a wireless communication system 10. Both the master device 20 and the slave device 30 of the wireless communication system 10 are mounted on, for example, a vehicle (e.g., automobile). At this time, the master device 20 and the slave device 30 may be arranged in a common casing, or may not be arranged in a common casing. The number of master devices 20 may be one or more. When a plurality of master devices 20 are provided, each of the plurality of master devices 20 may communicate with at least one slave device 30 belonging to different groups, or each of the plurality of master devices 20 may communicate with at least one slave device 30 belonging to the same group. The master device 20 and the slave device 30 executes the wireless communication via one communication channel that is sequentially selected from a plurality of communication channels, such as Bluetooth Low Energy (here, Bluetooth is a registered trademark, hereinafter referred to as Bluetooth LE) communication.

As an example, the wireless communication system 10 of this embodiment includes one master device 20 and a plurality of slave devices 30. Here, although only one slave device 30 is shown in FIG. 1 for simplification of the drawing, all of the plurality of slave devices 30 may be configured in the same way.

For the wireless communication between the master device 20 and the slave device 30, a frequency band, for example, the 2.4 GHZ, the 5 GHZ, or the like for a short-range communication can be used. Such a high-frequency band radio wave has a stronger straightness than a radio wave in the LF band and is easily reflected at a metal body such as a vehicle body. The LF is an abbreviation for Low Frequency. As the short-range communication standard, for example, Bluetooth, Bluetooth LE, and the like can be adopted. As an example, the master device 20 and slave device 30 of this embodiment are configured to be able to perform the wireless communication in accordance with the Bluetooth LE standard (hereinafter referred to as Bluetooth LE communication). Details of the communication method related to communication connection, encrypted communication, and the like are performed according to the sequence defined by the Bluetooth LE standard.

The master device 20 includes a control circuit (i.e., CNT) 21, a wireless communication circuit (i.e., WC) 22, and an antenna 23, as shown in FIG. 1. In addition to the elements described above, the master device 20 includes an input-output interface for wired or wireless communication with devices other than the slave device 30, and a bus line. Here, processing such as a channel map control process, a channel map generation process, and a channel map share process, which will be described later, may be performed by the control circuit 21, or a part or all of these processing may be performed by a separate control device disposed outside of the master device 20.

The control circuit 21 is, for example, a computer including a processor 211 and a memory 212. The memory 212 includes, for example, RAM and ROM. The RAM is abbreviation for Random Access Memory. The ROM is abbreviation for Read Only Memory.

The processor 211 of the control circuit 21 executes a predetermined process (i.e., a control process) by executing a program stored in the ROM while using the RAM as a temporary storage area. The processor 211 constructs multiple functional units by executing multiple instructions included in the program. There may be a plurality of processors 211. The program storage medium is not limited to the ROM. For example, various storage media such as HDD and SSD can be adopted. The HDD is an abbreviation for Hard-Disk Drive. The SSD is an abbreviation for Solid State Drive.

The control circuit 21 including the processor 211 and the memory 212 are configured to cause the wireless communication system 10 to provide at least one of: a quality determination unit; a communication channel determination unit; a channel map share unit; a share determination unit; and a communication disconnection unit.

The processor 211 is, for example, a CPU, a MPU, a GPU, a DFP, or the like. The CPU is an abbreviation for Central Processing Unit. The MPU is an abbreviation for Micro-Processing Unit. The GPU is an abbreviation for Graphics Processing Unit. The DFP is an abbreviation for Data Flow Processor. The control circuit 21 may be implemented by combining multiple types of calculation processing units such as a CPU, an MPU, and a GPU. Alternatively, the control circuit 21 may be realized as an SoC. The SoC is an abbreviation for System on Chip. The control circuit 21 may be implemented using an ASIC or FPGA. The ASIC is an abbreviation for Application Specific Integrated Circuit. The FPGA is an abbreviation for Field-Programmable Gate Array.

The control circuit 21 generates a command that requests the processing to the slave device 30 (for example, a command that requests data, a command that requests execution of a predetermined process, and the like), and transmits transmission data including the command to the wireless communication circuit 22 by a transmission packet. Further, the control circuit 21 receives a packet transmitted from the slave device 30 via the wireless communication circuit 22, and executes a predetermined process based on the data included in the received packet. That is, the wireless communication performed between the master device 20 and the slave device 30 is packet communication.

The wireless communication circuit 22 includes a RF circuit (not shown) for wirelessly transmitting and receiving the packet. The wireless communication circuit 22 has a transmission function of modulating a transmission signal and oscillating at the frequency of a RF signal. The wireless communication circuit 22 has a reception function of demodulating the received signal. RF is an abbreviation for Radio Frequency.

The wireless communication circuit 22 modulates the packed including the data transmitted from the control circuit 21, and transmits the packet to the slave device 30 via the antenna 23. The control circuit 21 outputs, to the wireless communication circuit 22, data obtained by encrypting the transmission data such as battery information request data using, for example, encryption information to be exchanged in a connection establishment process described later. The wireless communication circuit 22 adds data required for the wireless communication, such as communication control information, to the transmission packet, and transmits the packet. The data required for the wireless communication includes, for example, an identifier (i.e., ID), a sequence number, a next sequence number, an error detection code, and the like. The wireless communication circuit 22 may control the data size, the communication format, the schedule, the error detection, and the like of the communication between the master device 20 and the slave device 30. The control related to these communications may be performed by the control circuit 21.

The wireless communication circuit 22 receives the packet transmitted from the slave device 30 via the antenna 23 and demodulates the packet. Then, the demodulated packet is transmitted to the control circuit 21. The antenna 23 converts an electric signal into radio waves and emits the radio waves into a space. The antenna 23 receives a radio wave propagating in space and converts the radio wave into an electric signal.

The slave device 30 includes a control circuit (i.e., CNT) 31, a wireless communication circuit (i.e., WC) 32, and an antenna 33, as shown in FIG. 1. In addition to the elements described above, the slave device 30 includes an input-output interface for wired or wireless communication with devices other than the master device 20, and a bus line. The control circuit 31 has the similar configuration to the control circuit 21 of the master device 20. The control circuit 31 includes a processor 311 and a memory 312, for example. The memory 312 includes, for example, a RAM and a ROM.

The control circuit 31 performs the requested processing (e.g., the response processing for obtaining and returning requested data, execution processing of the requested processing, and the like) based on the request command obtained via the wireless communication circuit 32. For example, when the request command included in the received data is a request to transmit the battery information, the control circuit 31 of the slave device 30 transmits the transmission request to the monitoring device of the corresponding battery stack, and acquires the battery information from the monitoring device. then, the control circuit 31 transmits, as a response to the request, the data encrypted using the encryption information including the processing result (for example, the acquired battery information), to the wireless communication circuit 32. The control circuit 31 can also control, for example, equipment mounted on a vehicle according to requested processing.

The wireless communication circuit 32 includes a RF circuit (not shown) for wirelessly transmitting and receiving the packet. The wireless communication circuit 32 has a transmission function and a reception function, similarly to the wireless communication circuit 22. The wireless communication circuit 32 receives the packet transmitted from the master device 20 via the antenna 33 and demodulates the packet. Then, the data included in the demodulated packet is transmitted to the control circuit 31. The wireless communication circuit 32 modulates the packed including the data transmitted from the control circuit 31, and transmits the packet to the master device 20 via the antenna 33. The wireless communication circuit 32 adds data required for the wireless communication, such as communication control information, to the transmission packet, and transmits the packet.

The wireless communication circuit 32 may control the data size, the communication format, the schedule, the error detection, and the like of communication between the master device 20 and the slave device 30. The control related to these communications may be performed by the control circuit 31. The antenna 33 converts an electric signal into radio waves and emits the radio waves into space. The antenna 33 receives a radio wave propagating in space and converts the radio wave into an electric signal.

Figure 2:
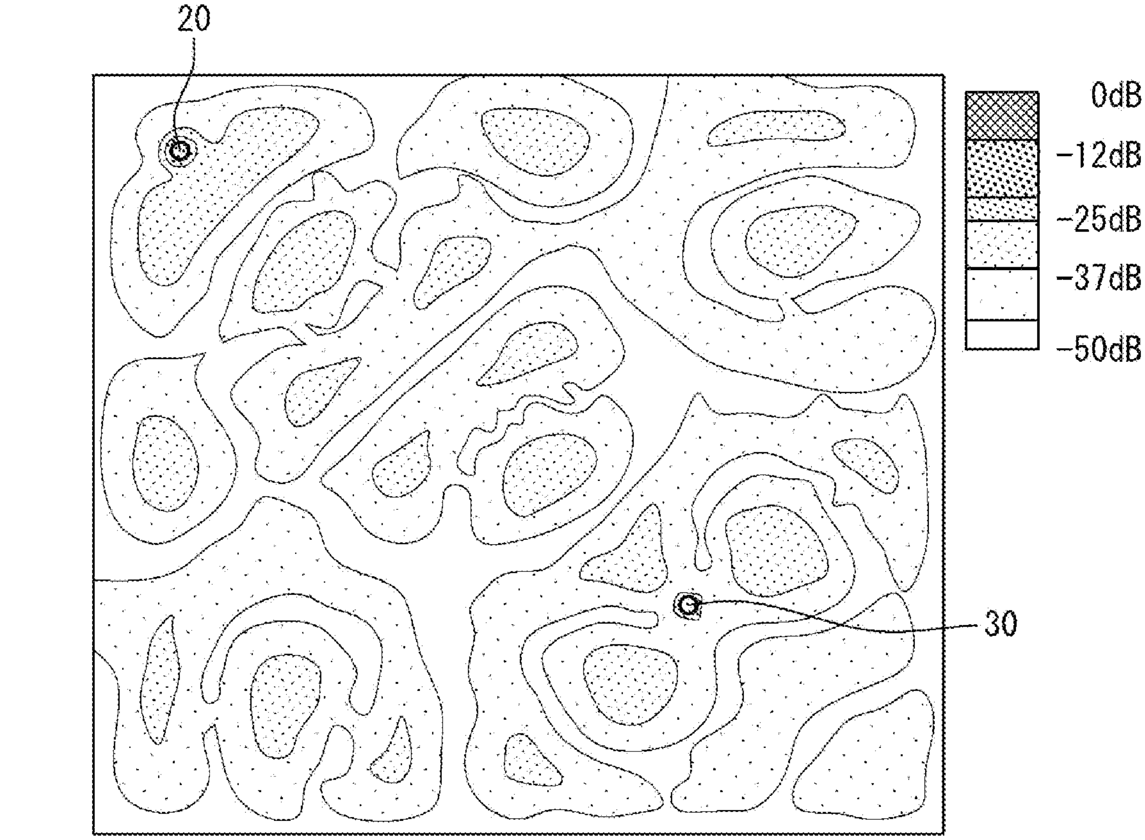
FIG. 2 is a diagram showing one example of the electric field strength distribution of the communication environment between the master device and the slave device.

FIG. 2 is a diagram showing one example of the electric field strength distribution of the communication environment between the master device 20 and the slave device 30. FIG. 2 shows an electromagnetic field simulation result at a predetermined timing at a predetermined frequency. In the following, the electric field strength distribution may be referred to as electric field distribution.

The master device 20 and the slave device 30 are arranged at predetermined positions in the vehicle, for example. When a wireless electric wave signal with a predetermined frequency is transmitted from the master device 20 and slave device 30 placed at predetermined positions, interference between the transmission wave and reflection wave and interference with external noise may generate a portion with high electric field strength and another portion with low electric field strength in the usage environment. The reflection wave is generated by reflection from metal elements of the vehicle that are present around the master device 20 and slave device 30, such as reflection from the vehicle body, reflection from the metal casing, reflection from the harness, and the like. For this reason, the communication environment between the master device 20 and the slave device 30 has a plurality of so-called NULL points, which are portions with high electric field strength and portions with low electric field strength, as shown in FIG. 2.

When the slave device 30 is located in or near a portion with the low electric field strength in the electric field distribution with the master device 20, there is a high possibility that the slave device 30 will not be able to properly receive the wireless signal from the master device 20, so that a communication error may occur. A communication channel where such a communication error is likely to occur is a communication channel where communication quality has reduced.

Here, when the master device 20 and the slave device 30 perform the wireless communication via one communication channel sequentially selected from a plurality of communication channels, each communication channel has a different frequency, so that the electric field distribution of each communication channel may also change. As a result, the communication quality may vary between communication channels.

Figure 3:
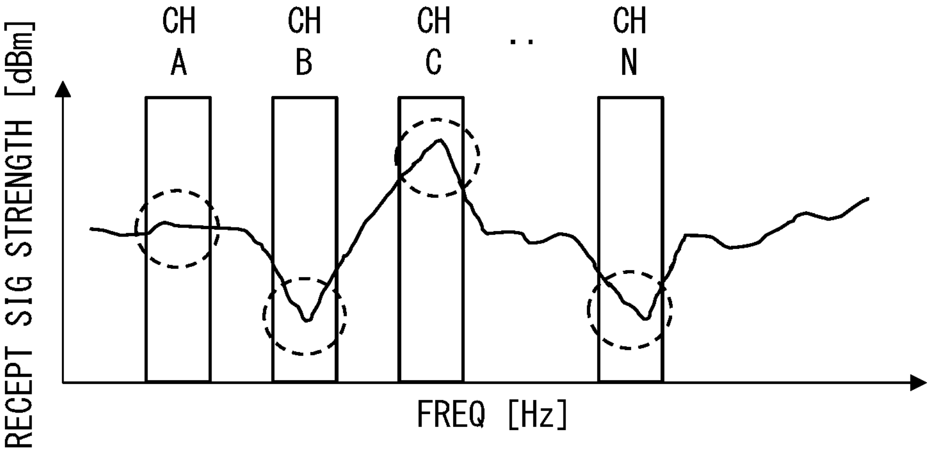
FIG. 3 is a diagram showing an example of received signal strength of each communication channel.

For example, as shown in FIG. 3, in the wireless communication via the communication channel A, reception power (i.e., reception signal strength), which is one of the parameters indicating the communication quality, is excellent. Furthermore, in the wireless communication via the communication channel C, the reception power shows a very high value. Therefore, when the master device 20 and the slave device 30 use the communication channels A and C with excellent or very high communication quality, the master device 20 and the slave device 30 can perform the high-quality wireless communication in which communication errors are sufficiently suppressed. On the other hand, in the wireless communication via the communication channels B and N, the reception power is low. For this reason, when the master device 20 and the slave device 30 use the communication channels B and N with reduced communication quality, there is a high possibility that a communication error will occur in the wireless communication. Here, in FIG. 3, in order to facilitate understanding, an example of received signal strength with respect to frequency is shown by a solid line.

Therefore, it may be preferable that the wireless communication between the master device 20 and the slave device 30 is performed using a communication channel that can perform the high quality wireless communication, avoiding a communication channel where the communication quality has reduced.

Here, the electric field distribution between the master device 20 and the slave device 30 changes depending on the external environment (such as external noise, and the like), the vibration of the master device 20 and/or the slave device 30 (including the vibration of the harness), and the like. Therefore, when the master device 20 and the slave device 30 are mounted in a vehicle, the electric field distribution of the communication environment between the master device 20 and the slave device 30 changes depending on, for example, the state of the vehicle (e.g., running state or stopped state) and the state of the vehicle. It changes depending on the state of the surrounding environment (for example, whether there is a lot of external noise or little external noise). As a result, the communication channels with excellent communication quality and the communication channels with reduced communication quality are not fixed and may change from time to time. Therefore, in response to a reduction in the communication quality, the corresponding communication channel is deleted from multiple communication channels used for the wireless communication, and in response to the recovery of communication quality, the corresponding communication channel is restored as one of multiple communication channels used for the wireless communication.

Figure 5:
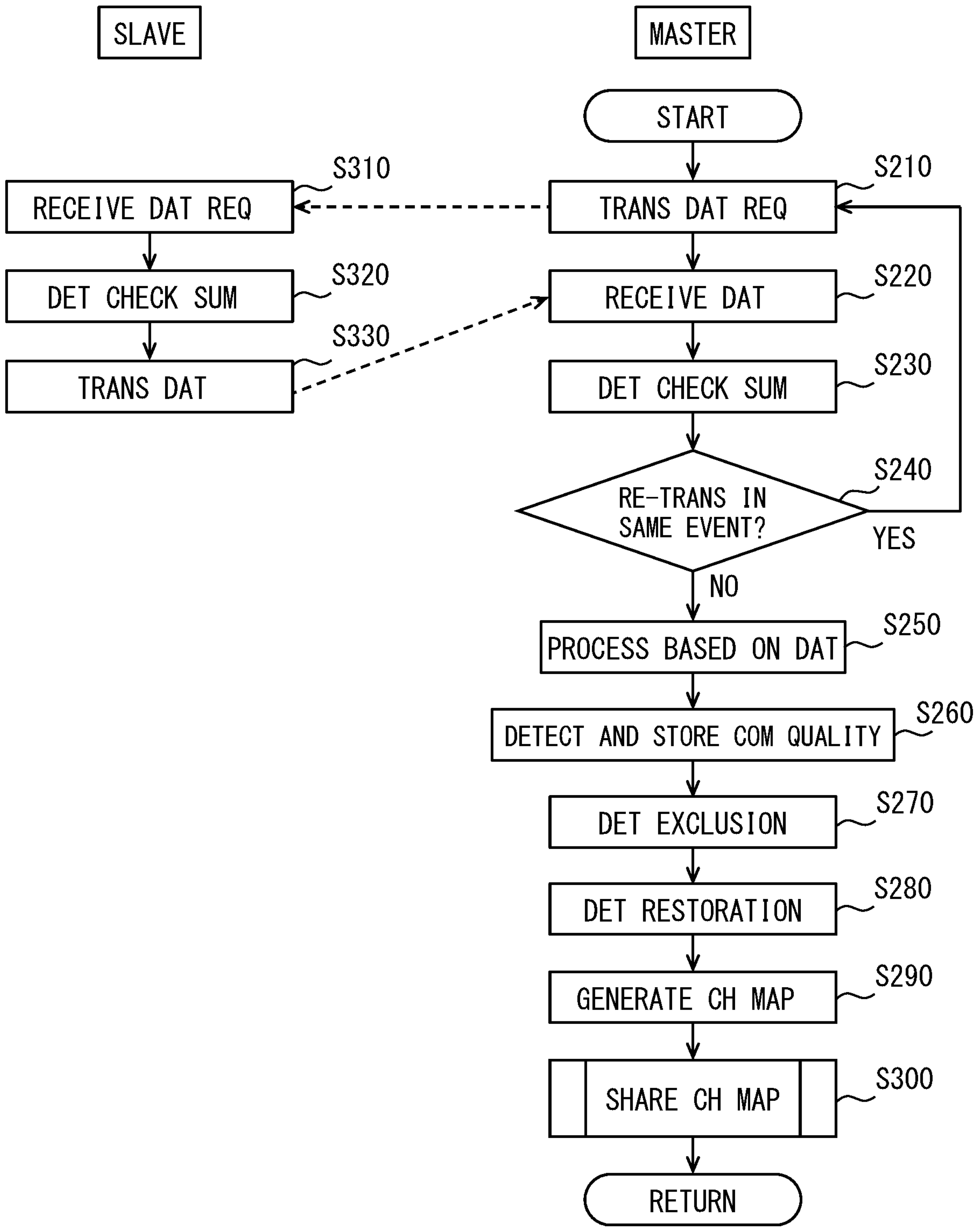
FIG. 5 is a flowchart showing an example of a communication sequence between the master device and the slave device according to the first embodiment.

In the wireless communication system 10 of the present embodiment, as a plurality of communication channels used for wireless communication, a part of the communication channels in which a certain communication quality is ensured are used, other than a communication channel in which the communication quality is reduced due to channel map control, so that a control process for realizing the wireless communication between the master device 20 and the slave device 30 will be explained with reference to a drawing showing a communication sequence between the master device 20 and the slave device 30 shown in FIG. 5. In FIG. 5, the master device 20 is indicated as MASTER, and the slave device 30 is indicated as SLAVE. Further, FIG. 5 shows a communication sequence executed between the master device 20 and one slave device 30. The master device 20 individually executes the communication sequence shown in FIG. 5 with the plurality of slave devices 30.

Figure 4:
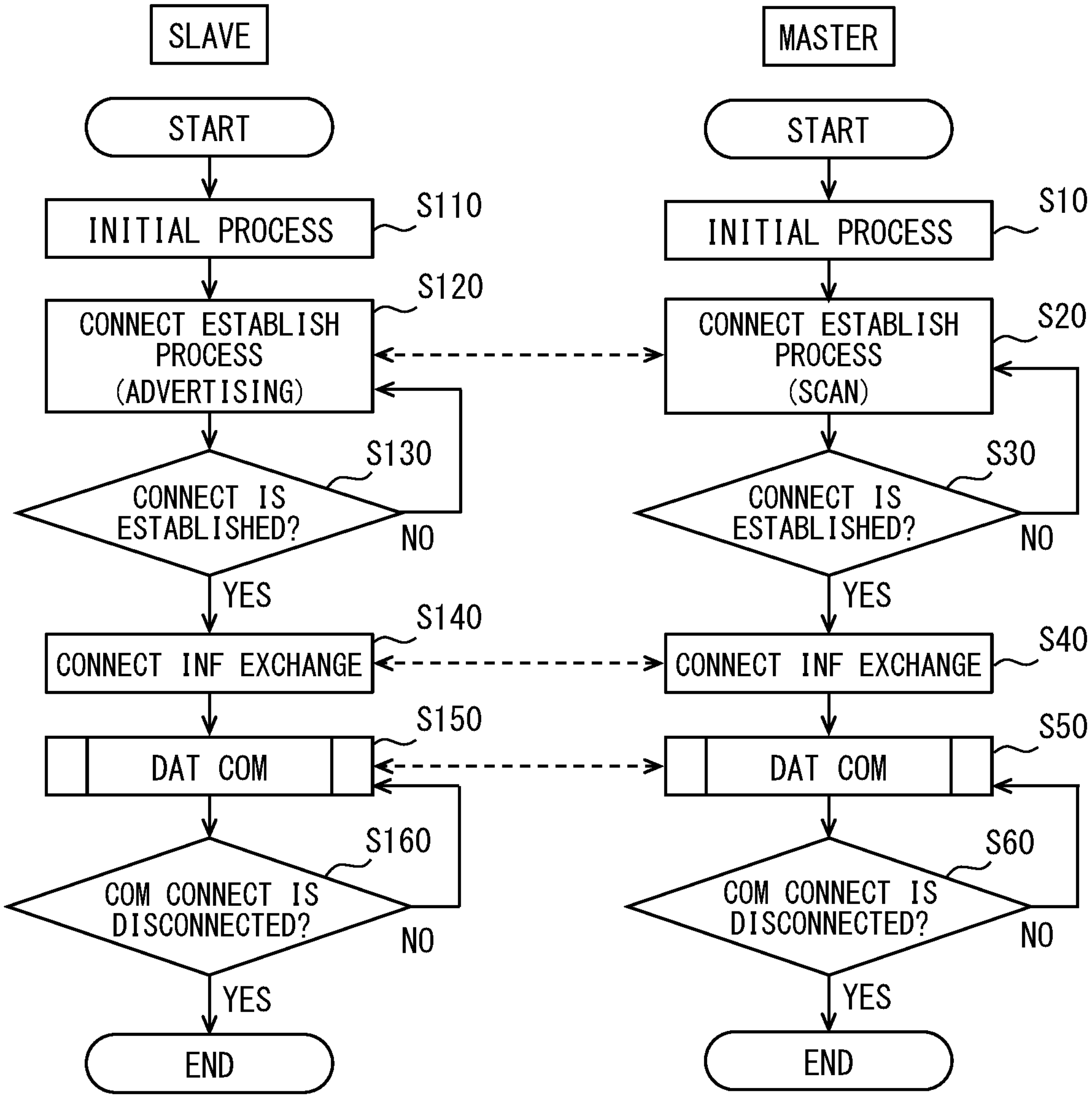
FIG. 4 is a flowchart showing an example of a connection sequence between the master device and the slave device according to the first embodiment.

Here, the master device 20 and the slave device 30 execute a connection establishment process before executing the communication sequence shown in FIG. 5. FIG. 4 shows a connection sequence including the connection establishment process from when the master device 20 and the slave device 30 are activated until data communication is performed. For example, when the wireless communication system 10 is mounted in a vehicle, a connection sequence is started when the IG signal is switched from the off state to the on state, for example, by a user's operation. Here, when the master device 20 and the slave device 30 are always connected, the connection sequence is performed only once at a predetermined timing. Here, if an error occurs during the communication and the wireless communication connection between the master device 20 and the slave device 30 is disconnected, a connection sequence may be performed for reconnection.

When the connection sequence is started, the master device 20 and slave device 30 execute an initialization process to initialize various variables, timers, and the like in steps S10 and S110, respectively. Thereafter, the master device 20 and slave device 30 execute the connection establishment process in steps S20 and S120, respectively. This connection establishment process is executed between the master device 20 and all the slave devices 30 when a plurality of slave devices 30 as a communication connection target are connected to the master device 20 for wireless communication. In the connection establishment process, for example, the slave device 30 performs an advertising operation of transmitting an advertising signal via an advertising communication channel, and the master device 20 performs a scanning operation of scanning advertising signals. The communication channel for advertising includes a plurality of communication channels (for example, three in the case of Bluetooth LE). When the master device 20 receives an advertising signal through one of the communication channels through a scanning operation, the master device 20 transmits a connection request to the slave device 30 that has transmitted the advertising signal. Thereby, a communication connection is established between the master device 20 and the slave device 30. When the master device 20 and the slave device 30 determine in steps S30 and S130, respectively, that the communication connection has been established, the master device 20 proceeds to step S40, and the slave device 30 proceeds to step S140.

The master device 20 and slave device 30 exchange connection information in steps S40 and S140, respectively. In this exchange of the connection information, the master device 20 and the slave device 30 exchange encryption information used for the data communication and execute a share process for sharing the initial information regarding frequency channel hopping. The initial information includes, for example, a channel map, a hopping pattern or a function for hopping.

Next, in steps S50 and S150, respectively, the master device 20 and the slave device 30 execute the data communication via a data communication channel sequentially selected from a plurality of communication channels for each communication event that occurs periodically. A process for performing this data communication is shown in the communication sequence of FIG. 5. Here, when a plurality of slave devices 30 are provided, the master device 20 sequentially communicates with the plurality of slave devices 30 by assigning a communication period (as a sub-event) to each communication event to the plurality of slave devices 30.

When the master device 20 and the slave device 30 determine to disconnect the communication connection in steps S60 and S160, respectively, the master device 20 and the slave device 30 end the connection sequence shown in FIG. 4. For example, when the wireless communication system 10 is mounted in a vehicle, the master device 20 and the slave device 30 may determine to disconnect the communication connection when the IG signal is switched from the on state to the off state by a user operation. Further, the master device 20 and the slave device 30 may determine to disconnect the communication connection when the data communication cannot be performed normally a predetermined number of times (e.g., corresponding to the third predetermined number of times) in succession. Furthermore, in this embodiment, as will be described later, when the master device 20 determines that a new channel map cannot be shared with the slave device 30 during the channel map update period (i.e., the channel map update cycle), the master device 20 determines to disconnect the communication connection.

Next, the communication sequence of the data communication will be explained with reference to the flowchart of FIG. 5. As shown in FIG. 5, the master device 20 transmits, for example, a data request command, that is, a data request, to the slave device 30 in step S210. Here, in addition to the data request, the master device 20 can also transmit, for example, a request to execute a predetermined process. When the slave device 30 receives the data request in step S310, in step S320, the slave device 30 performs, for example, a checksum determination based on the error detection code included in the received data request in order to confirm whether or not the data request has been properly received. When the slave device 30 determines in the process of step S320 that the data request cannot be received properly based on the checksum determination result, for example, in step S330, the slave device 30 transmits a signal indicating that the data request cannot be received properly, or a signal for requesting retransmission of the data request. On the other hand, when the slave device 30 determines in the process of step S320 that the data request has been properly received, in step S330, the slave device 30 performs a predetermined process necessary for response, for example, a process of acquiring and transmitting the requested data.

Here, the master device 20 and the slave device 30 perform frequency channel hopping to switch data communication channels to be used for each communication event, and transmit and receive data requests and requested data. At this time, the master device 20 and the slave device 30 determine the communication channel to be switched by the frequency channel hopping, according to the channel maps that each of the master device 20 and the slave device 30 stores. Here, in the case of Bluetooth LE communication, thirty-seven communication channels are prepared as data communication channels.

The master device 20 receives the requested data in step S220. Then, in step S230, the master device 20 performs, for example, a checksum determination based on the error detection code included in the received data, in order to confirm whether the data has been properly received. In the following step S240, the master device 20 determines whether or not to execute processing for retransmission within the same communication event when it is determined in the process of step S230 that the data cannot be received correctly or when a signal indicating that the data request cannot be received correctly is received from the slave device 30. For example, the master device 20 may determine execution of retransmission when there is enough time to perform retransmission until the end time of the current communication event (or, sub-even), and may determine non-execution of retransmission when there is no enough time until the end time of the current communication event. In step S240, when the master device 20 determines to perform retransmission, the master device 20 executes the process from step S210 again. When it is determined that the data is correctly received in step S230 or it is determined that the retransmission of data is not executed in step S240, the master device 20 proceeds to step S250.

In step S250, the master device 20 executes a process based on the information included in the received data. Here, if it is determined in the process of step S230 that the data has not been received correctly, or if a signal indicating that the data request has not been correctly received is received from the slave device 30, and it is determined in the process of step S240 that the retransmission is not performed, the process in step S250 may be omitted, or the process in step S250 may be executed based on previously received data.

In S260, the master device 20 detects the received signal strength indicator (RSSI) and the packet error rate (PER) as the characteristic data indicating the communication quality of the signal received from the slave device 30. The RSSI is an index indicating the strength of a signal transmitted from the slave device 30 and received by the master device 20. The PER indicates a ratio of the number of error packets to the number of received packets received by master device 20 in percentage. The master device 20 may detect signal noise ratio (SNR)/signal interference noise ratio (SINR), instead of the RSSI. The SNR/SINR may be detected by, for example, a ratio between an RSSI value when the master device 20 receives a radio signal from the slave device 30 and an RSSI value when the master device 20 does not receive a radio signal. Furthermore, the master device 20 may detect the bit error rate (BER) or the packet arrival rate (PAR) instead of the PER. The master device 20 stores and accumulates the detected RSSI or SNR/SINR, and PER, BER or PAR, for each communication channel. In addition to or instead of the detection by the master device 20 as described above, the characteristic data indicating the communication quality may also be acquired by the slave device 30. The slave device 30 may detect an RSSI, a PER, or the like from a received signal transmitted from the master device 20, and transmit the detected RSSI, the PER, or the like to the master device 20.

In step S270, the master device 20 determines whether the communication quality of the communication channel used for wireless communication with the slave device 30 has been reduced based on the characteristic data indicating the communication quality of the communication channel detected in step S260. Then, the master device 20 excludes the communication channel whose communication quality is determined to be reduced from the communication channels to be used for the wireless communication between the master device 20 and the slave device 30. The excluded communication channel is a communication channel for data. For example, an example of a condition for determining the reduction in the communication quality is that the RSSI is compared with a threshold value for the RSSI, and the PER is compared with a threshold value for the PER, and as a result, at least one of the RSSI and the PER is not satisfied with a condition of the threshold value. Here, the number of parameters to be compared with the threshold value may be one. Alternatively, the parameter to be compared with the threshold value may be the immediately preceding parameter detected in step S260, or may be an average or a center value of a predetermined number of parameters detected in multiple past wireless communications regarding the same communication channel.

In step S280, the master device 20 executes restoration determination of the excluded communication channel based on the exclusion determination at the time of the previous communication event. In this restoration determination, if a predetermined restoration condition is met, the excluded communication channel is restored as a communication channel to be used for wireless communication. For example, as an example of the predetermined restoration condition, an excluded communication channel may be restored when a predetermined period of time has elapsed since the communication channel was excluded. Alternatively, as another example of the predetermined restoration condition, in response to a communication channel adjacent to the excluded communication channel showing the excellent communication quality, the excluded communication channel may be restored as a communication channel to be used for wireless communication. In this way, the communication channel determined to be able to restore as a communication channel to be used for wireless communication is incorporated into the channel map and actually used for wireless communication between the master device 20 and the slave device 30. The exclusion determination process in step S270 and the restoration determination process in step S280 correspond to the channel map control process in the present embodiment. Here, if the communication quality of the communication channel that has been determined to be restored remains to be reduced when the communication channel is actually used for wireless communication, the communication channel may be a target of exclusion again by the exclusion determination.

In step S290, the master device 20 performs channel map generation processing based on the exclusion determination result in step S270 and the restoration determination result in step S280. In this embodiment, individual channel maps are generated for a plurality of slave devices 30. Here, it is also possible to generate a common channel map for multiple slave devices 30. When generating a common channel map, it may be sufficient to perform an AND operation on the communication channels included in the channel map of each slave device 30 and extract a plurality of communication channels that are common to all of the channel map.

The channel map may indicate communication channels that can be used for wireless communication, or may indicate communication channels that cannot be used for wireless communication. Alternatively, both the usable communication channels and the unusable communication channels may be indicated in the channel map. When there is a change in usable/unusable communication channels due to the creation of the channel map, the frequency channel hopping pattern may be updated. When the frequency channel hopping pattern is not updated or when the communication channel to be hopped cannot be used, the communication channel to be hopped for next communication event may be used.

In step S300, the master device 20 executes a process for sharing the channel map generated by the channel map generation process in step S290 with the slave device 30. This channel map share process will be explained in detail later.

Here, the above-described exclusion determination process and the restoration determination process may be performed every time the communication is performed between the master device 20 and the slave device 30. Alternatively, the exclusion determination process and the restoration determination process may be performed all at once, each time a plurality of communications are performed between the master device 20 and the slave device 30, in accordance with the channel map update period described below. In this case, each time the communication is performed between master device 20 and slave device 30, characteristic data indicating the communication quality of the communication channel used for communication is detected and accumulated in step S260. Then, based on the accumulated characteristic data, the exclusion determination in step S270 and the restoration determination in step S280 are performed together. Similarly, the channel map generation process in step S290 may be performed every time the communication is performed between the master device 20 and the slave device 30. Alternatively, the channel map generation process may be performed every time the communication is performed between the master device 20 and the slave device 30 a plurality of times in accordance with a channel map update period to be described later.

Next, the above-mentioned channel map share process will be explained with reference to the flowchart of FIG. 6. The flowchart in FIG. 6 shows an example of the channel map share process.

Figure 7:
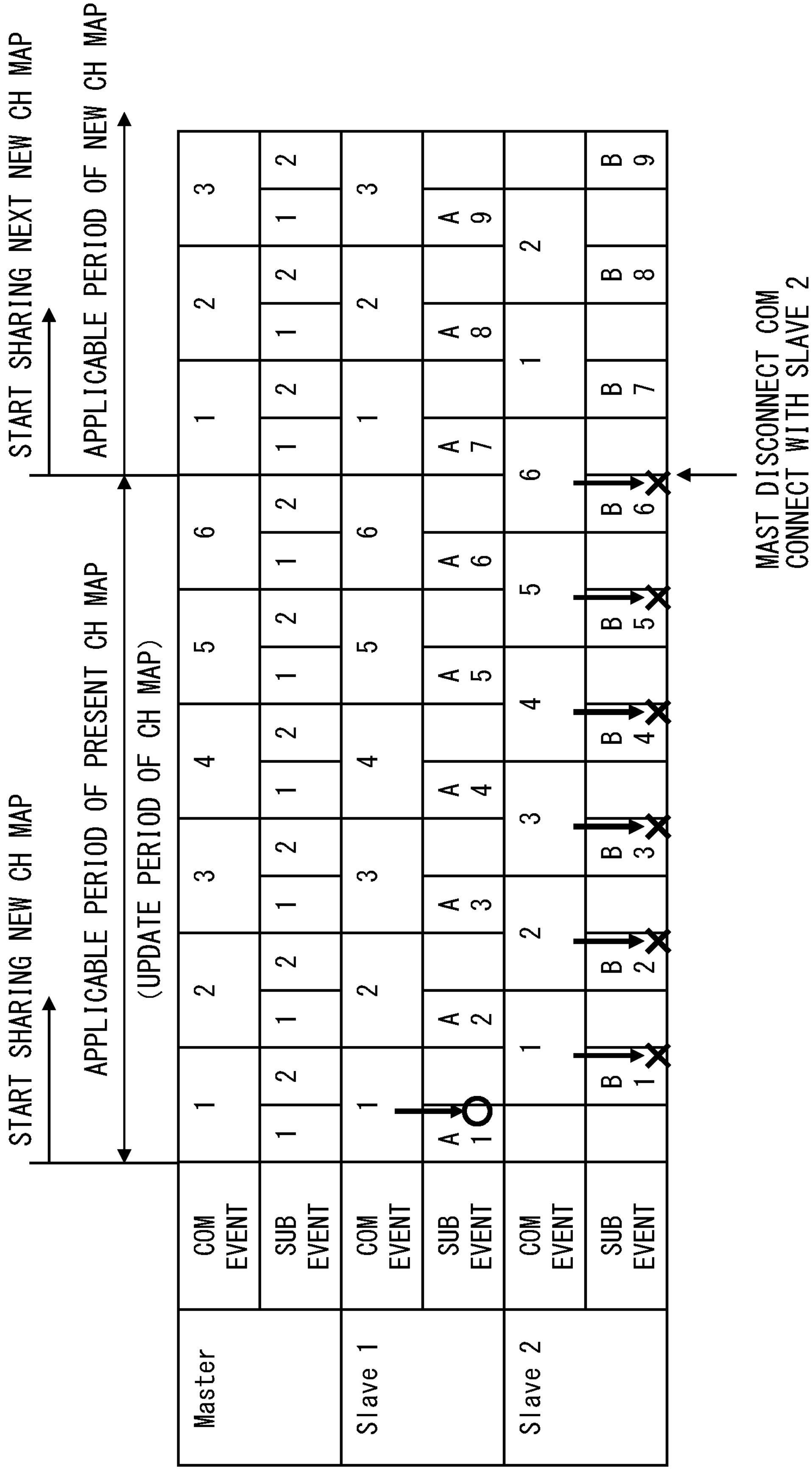
FIG. 7 is a time chart for explaining an example of control by the channel map share processing according to the first embodiment.

In this embodiment, as shown in the time chart of FIG. 7, a channel map to be shared between the master device 20 and the slave device 30 is updated for each of multiple communication events (in the example shown in the drawing, six communication events). That is, the period of multiple communication events is the application period of the channel map and the channel map update period. In this way, by periodically updating the channel map, the master device 20 and slave device 30 can perform high-quality communication using a channel map that adapts to changes in the communication quality of each communication channel. Here, the channel map may be updated irregularly, for example, on the condition that the channel map has been updated. In other words, the channel map may be updated on the condition that a change occurs in the communication channel included in the channel map as a result of the exclusion determination process and the restoration determination process. Here, as shown in FIG. 7, in each communication event, the master device 20 is configured to perform one communication in a sub-event assigned to each slave device 30.

As shown in the time chart of FIG. 7, the new channel map share process is started during the application period of the current channel map. In other words, the new channel map is generated by a channel map generation process based on characteristic data indicating multiple communication qualities detected before the application period of the current channel map, and is confirmed as a new channel map. Furthermore, the next new channel map is generated based on a plurality of characteristic data indicating the communication quality detected from the communication between the master device 20 and the slave device 30 during the application period of the current channel map, and the next new channel map is confirmed before the application period of the new channel map.

Figure 6:
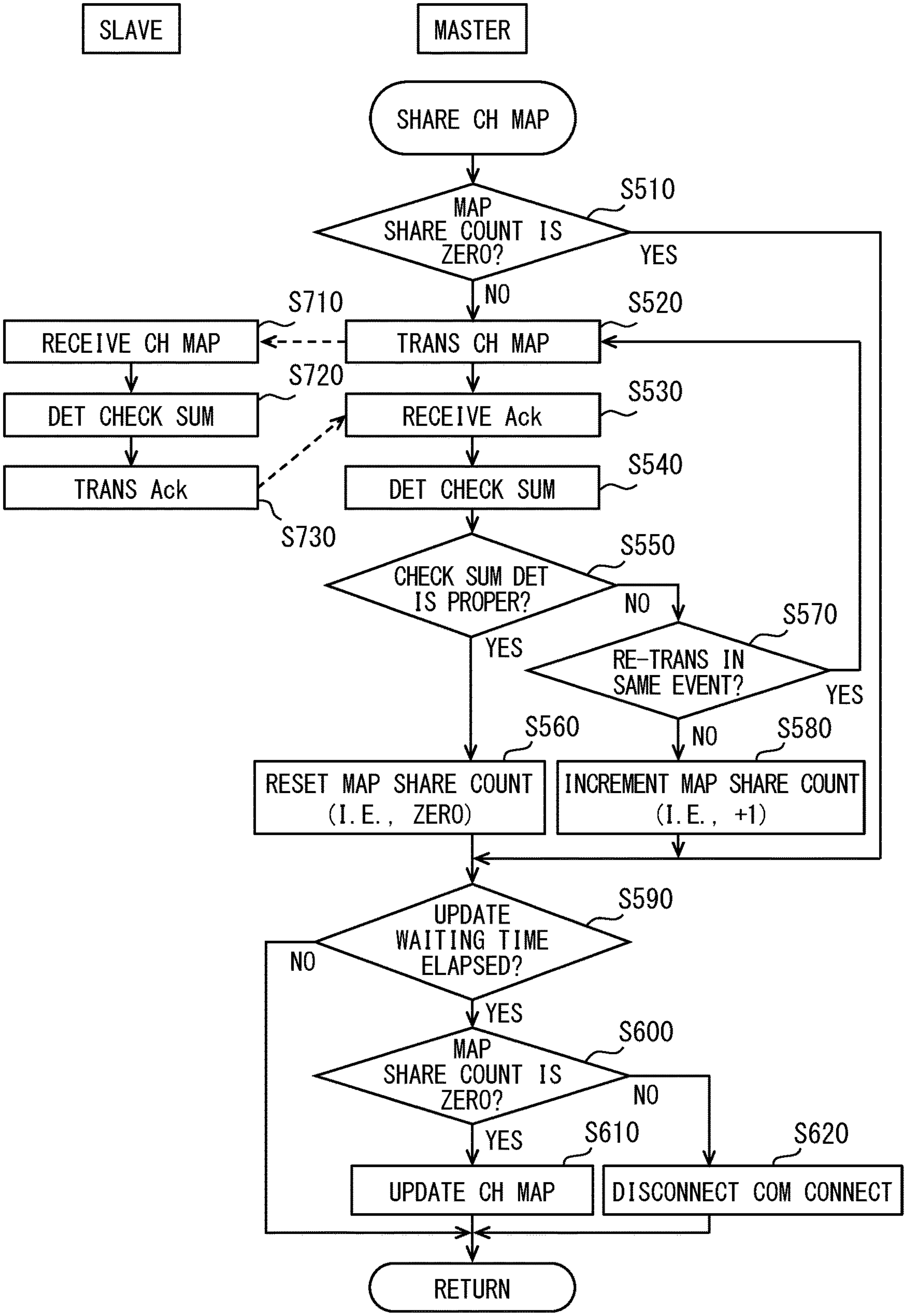
FIG. 6 is a flowchart showing an example of a channel map share processing according to the first embodiment.

The channel map share process shown in the flowchart of FIG. 6 is for sharing a new channel map between the master device 20 and the slave device 30 at each channel map update period shown in the time chart of FIG. 7. In the first step S510, the master device 20 determines whether the value of the map sharing counter is zero, which indicates that the channel map has been successfully shared between the master device 20 and the slave device 30. Here, the map sharing counter is initially set to a value other than zero when the channel map update period is started.

If the value of the map sharing counter is zero and the new channel map has been successfully shared between the master device 20 and the slave device 30, it is no longer necessary to transmit the new channel map from the master device 20 to the slave device 30. Therefore, the master device 20 proceeds to step S590. On the other hand, if the value of the map sharing counter is other than zero and the new channel map is not yet shared between the master device 20 and the slave device 30, the master device 20 proceeds to step S520.

In S520, the master device 20 transmits the new channel map to the slave device 30. At this time, the master device 20 transmits the new channel map as well as information indicating the timing to start using the new channel map. The timing to start using the new channel map comes every time the channel map update period elapses, as in the example shown in the time chart of FIG. 7.

In step S710, the slave device 30 receives the new channel map and the timing information transmitted from the master device 20. When the slave device 30 receives the new channel map and the timing information in step S710, in step S720, the slave device 30 performs the check sum determination based on the error detection code included in the received packet in order to confirm whether or not the new channel map and the timing information have been correctly received. If the slave device 30 determines in step S720 that the new channel map and the timing information have not been correctly received based on the check sum determination result, for example, in step S730, the slave device 30 does not transmit a reception confirmation signal (i.e., acknowledgement signal or Ack signal) of the new channel map. On the other hand, if the slave device 30 determines in step S720 that the new channel map and the timing information have been correctly received, the slave device 30 returns a reception confirmation signal (i.e., Ack signal) for the new channel map to the master device 20 in step S730.

In S53, the master device 20 receives the Ack signal transmitted from the slave device 30. In S540, the master device 20 performs, for example, checksum determination based on the error detection code included in the received Ack signal in order to confirm whether the Ack signal has been correctly received. Here, if the master device 20 cannot receive the Ack signal itself, the result of the check sum determination will be not-good, i.e., NG. In the following step S550, the master device 20 determines whether the result of the check sum determination in step S540 is OK or NG. If the check sum determination result is OK, the master device 20 proceeds to step S560. On the other hand, if the result of the check sum determination is NG, the master device 20 proceeds to step S570.

In step S560, the master device 20 resets the map sharing counter described above to zero. In this way, the map sharing counter is reset to be zero when the slave device 30 determines that the new channel map and the timing information have been correctly received, and the slave device 30 transmits the Ack signal, and the master device 20 determines that the Ack signal is correctly received. Therefore, when the value of the map sharing counter is zero, it can be said that the master device 20 and the slave device 30 have successfully shared the new channel map, as described above.

For example, the time chart of FIG. 7 shows an example such that the slave device 30 indicated as "Slave 1" normally receives the new channel map and the timing information from the master device 20 in the first communication (i.e., "communication event"=1) after the channel map update period starts and the new channel map share starts, the master device 20 normally receives the Ack signal transmitted from the slave device 30, so that the new channel map is shared between the master device 20 and the slave device. In this case, the map sharing counter is reset to zero in step S560. Therefore, in the second and subsequent communications (i.e., "communication event"=2 to 6) during the channel map update period, the determination result in step S510 is "Yes", so the new channel map and the timing information may not be further transmitted.

On the other hand, in step S570, since the Ack signal has not been correctly received, the master device 20 determines whether to execute processing for retransmission within the same communication event. In step S570, when the master device 20 determines to perform retransmission, the master device 20 executes the process from step S520 again. If it is determined in step S570 not to perform retransmission, the master device 20 proceeds to step S580. In step S580, the master device 20 increments the map sharing counter by one. In this manner, the map sharing counter is incremented if it is not considered that the master device 20 and the slave device 30 have successfully shared the new channel map. Therefore, if the value of the map sharing counter is a value other than zero, it can be considered that the master device 20 and the slave device 30 have not yet successfully shared the new channel map.

For example, the time chart of FIG. 7 shows an example such that the slave device 30 indicated as "Slave 2" does not normally receive the new channel map and the timing information from the master device 20 in the first communication (i.e., "communication event"=1) after the channel map update period starts and the new channel map share starts, the Ack signal is not returned, or the master device 20 does not normally receive the Ack signal although the slave device 30 transmits the Ack signal, so that it is considered that the sharing of the new channel map between the master device 20 and the slave device is failed. In this case, in step S580, the map sharing counter is incremented by 1 and becomes a value other than zero. Therefore, in the second and subsequent communications (i.e., "communication event"=2 to 6) during the channel map update period, the determination result in step S510 is "No", so the processes from step S520 are executed. That is, the transmission of the new channel map and the timing information from the master device 20 to the slave device 30 is repeatedly executed for each communication event. This transmission of the new channel map and the timing information continues during the channel map update period until the master device 20 and the slave device 30 successfully share the channel map and the map sharing counter is reset to zero.

In step S590, the master device 20 determines whether the waiting time until updating to a new channel map has elapsed, that is, whether the channel map update period has expired. In this determination process, if it is determined that the waiting time has elapsed, the master device 20 proceeds to step S600. On the other hand, if it is determined that the waiting time has not elapsed, the master device 20 ends the process shown in the flowchart of FIG. 6.

In step S600, the master device 20 determines whether the value of the map sharing counter is zero. If the value of the map sharing counter is zero, the value of the map sharing counter indicates that the master device 20 and the slave device 30 have successfully shared the new channel map. Therefore, the master device 20 updates the channel map from the current channel map to the new channel map in step S610. Thereby, the master device 20 and the slave device 30 can communicate via the communication channel selected according to the new channel map.

On the other hand, if it is determined in step S600 that the value of the map sharing counter is a value other than zero, there is a possibility that the sharing of the new channel map and the timing information between the master device 20 and the slave device 30 has failed although the new channel map and the timing information are transmitted a predetermined number of times (corresponding to the first predetermined number of times, for example, in the example shown in FIG. 7, six times transmitted). Therefore, the master device 20 disconnects the communication connection with the slave device 30 in step S620. At this time, the communication connection is disconnected with respect to the wireless communication connection with a slave device 30 that is considered to be unable to share a channel map among the plurality of slave devices 30.

The timing at which the communication connection with the slave device 30 is disconnected corresponds to the timing at which the application period of the new channel map starts, that is, the timing at which the use of the new channel map starts, as shown in the time chart of FIG. 7. Therefore, it is possible to prevent communication errors from occurring continuously due to differences in channel maps between the master device 20 and the slave device 30, and to suppress the occurrence of a situation where the communication reliability is reduced.

Here, when the master device 20 disconnects the communication connection with the slave device 30, the master device 20 starts the connection sequence of FIG. 4 described above in order to reconnect with the slave device 30 from which the communication connection was disconnected. On the other hand, when the slave device 30 becomes unable to perform data communication with the master device 20 and the number of communication errors reaches a predetermined number (corresponding to the third predetermined number of times), the slave device 30 disconnects the communication connection with the master device 20. After the communication connection is disconnected, the slave device 30 also starts the connection sequence shown in FIG. 4. As a result, reconnection between the master device 20 and the slave device 30 is attempted. In the connection sequence that is the reconnection process, a communication connection is established between the master device 20 and the slave device 30, and the connection information including a channel map indicating a communication channel to be used for wireless communication is shared between the master device 20 and the slave device 30. This allows the master device 20 and the slave device 30 to perform the wireless communication again.

Second Embodiment

Next, a wireless communication system 10 according to a second embodiment of the present disclosure will be described with reference to the drawings. Since the wireless communication system 10 according to the present embodiment has similar configuration to the wireless communication system 10 of the first embodiment, description of the similar configuration will be omitted.

In the wireless communication system 10 according to the first embodiment described above, if it is not determined that the sharing of the new channel map between the master device 20 and the slave device 30 has been succeeded although the new channel map and the timing information are transmitted a predetermined number of times in the channel map update period, the master device 20 disconnects the communication connection with the slave device 30 at the timing of starting to use the new channel map. Here, in the first embodiment described above, based on the fact that the master device 20 cannot receive the channel map reception confirmation signal (i.e., Ack signal) from the slave device 30, it is determined whether the sharing of the new channel map between the master device 20 and the slave device 30 has been succeeded or failed.

However, even if the master device 20 cannot normally receive the Ack signal from the slave device 30, there may be a possibility that the slave device 30 can normally receive the new channel map and the timing information transmitted from the master device 20. If the slave device 30 has normally received the new channel map and the timing information, the master device 20 and the slave device 30 can communicate with each other using the new channel map. Therefore, if the slave device 30 is able to receive the new channel map and the timing information, it is not necessary for the master device 20 to disconnect the communication connection with the slave device 30 based on the fact that the master device 20 cannot normally receive the Ack signal from the slave device 30. Furthermore, if the communication connection with the slave device 30 is disconnected, the master device 20 and the slave device 30 will not be able to perform data communication for the period required for reconnection.

Therefore, in the wireless communication system 10 according to the present embodiment, in order to prevent unnecessary disconnection of communication connections, the master device 20 disconnects the communication connection with the slave device 30 after confirming that the sharing of the new channel map between the master device 20 and the slave device 30 cannot be succeeded instead of simply not being able to receive the Ack signal normally.

Hereinafter, the wireless communication system 10 according to the present disclosure will be described, focusing on the differences from the wireless communication system 10 according to the first embodiment.

Figure 8:
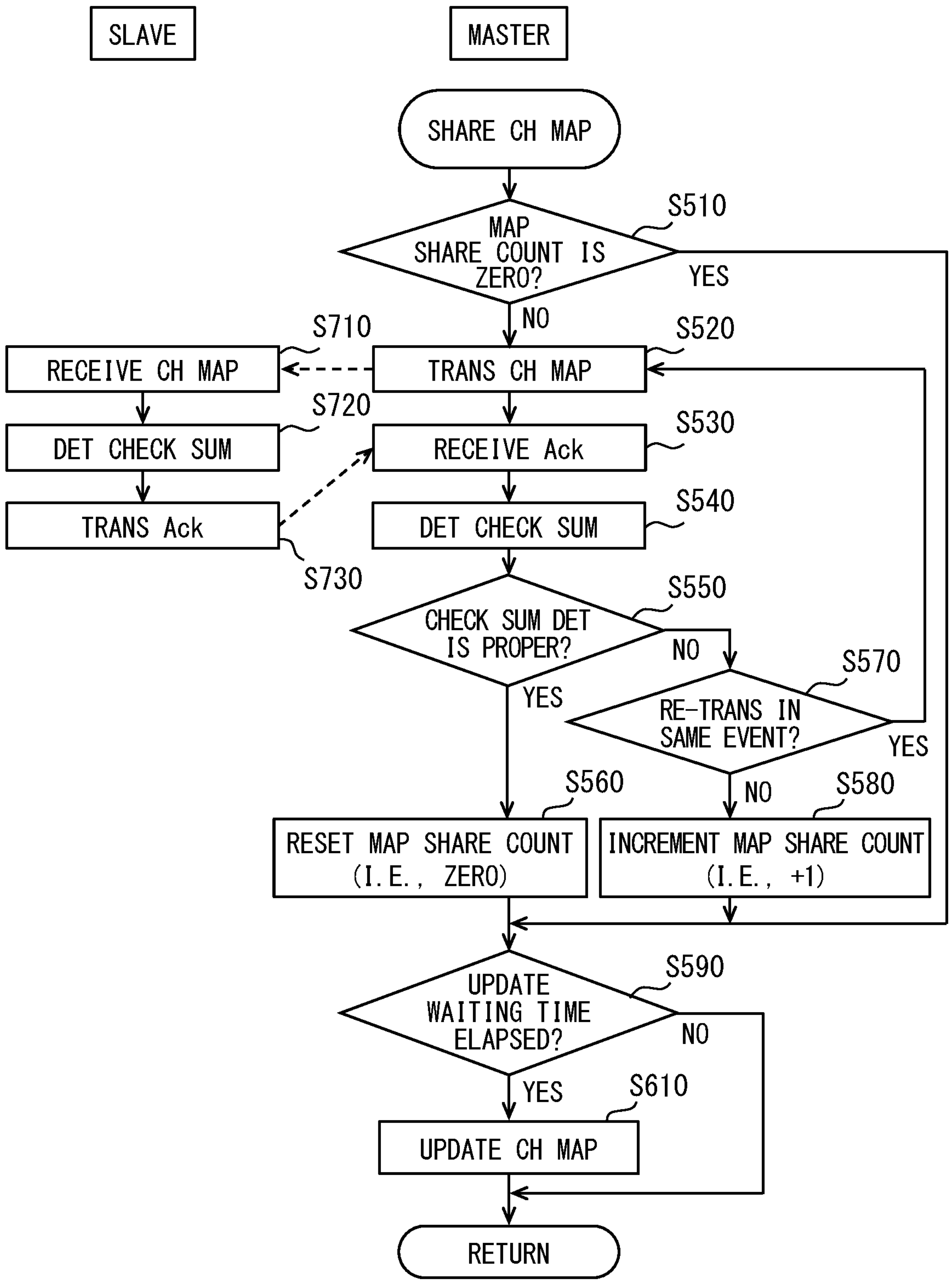
FIG. 8 is a flowchart showing an example of a channel map share processing according to the second embodiment.

FIG. 8 is a flowchart showing channel map share processing executed in the wireless communication system 10 according to the present embodiment. The channel map share process of the second embodiment shown in the flowchart of FIG. 8 differs from the channel map share process of the first embodiment shown in the flowchart of FIG. 6 in that steps S600 and S620 are deleted. Regarding other processing, there is no difference between the channel map share processing shown in the flowchart of FIG. 8 and the channel map share processing shown in the flowchart of FIG. 6.

In the channel map share process shown in the flowchart of FIG. 8, since the processes in steps S600 and S620 are deleted, when the master device 20 determines in step S590 that the waiting time until updating to a new channel map has elapsed, the channel map is updated from the current channel map to the new channel map in step S610 without determining whether the sharing of the new channel map has been succeeded based on the normal reception of the Ack signal.

Figure 9:
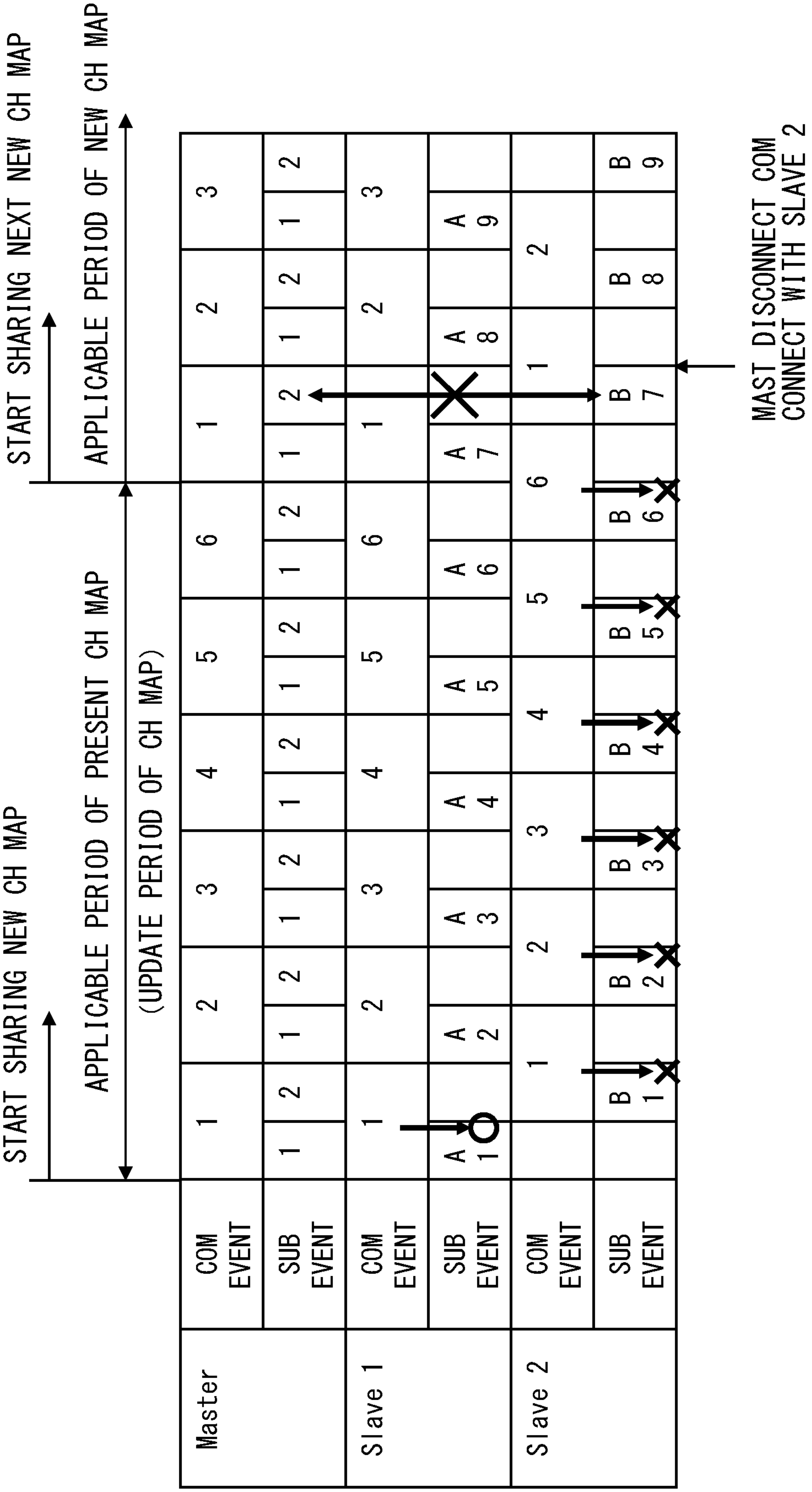
FIG. 9 is a time chart for explaining an example of control by the channel map share processing according to the second embodiment.

Then, as shown in the time chart of FIG. 9, the master device 20 attempts to perform data communication with the slave device 30 a predetermined number of times (corresponding to a second predetermined number of times). In the example shown in the time chart of FIG. 9, the predetermined number of times is set to one time, alternatively, the but predetermined number of times may not be limited to one time and may be two or more times. Here, the predetermined number of times corresponding to the second predetermined number of times is set to be less than the predetermined number of times corresponding to the third predetermined number of times, which is used to determine disconnection of communication connection when communication errors occur continuously instead of failure to share the channel map.

If the master device 20 is able to communicate with the slave device 30 after a predetermined number of communication attempts with the slave device 30, it can be considered that the sharing of the new channel map between the master device 20 and the slave device 30 has been succeeded. Therefore, the master device 20 continues to communicate with the slave device 30 using the new channel map.

If the master device 20 is not able to communicate with the slave device 30 after a predetermined number of communication attempts with the slave device 30, it can be considered that the sharing of the new channel map between the master device 20 and the slave device 30 has been failed. In that case, the master device 20 disconnects the communication connection with the slave device 30 at the timing when it is determined that the master device 20 cannot communicate with the slave device 30 even after attempting to communicate a predetermined number of times. In the example shown in the time chart of FIG. 9, the master device 20 attempts one communication with the slave device 30 shown as "Slave 2" via the communication channel selected according to the new channel map, but the master device 20 disconnects the communication connection with the slave device 30 of "Slave 2" at the timing when the first communication event ends since the master device 20 cannot communicate with the slave device 30 of "Slave 2".

Figure 10:
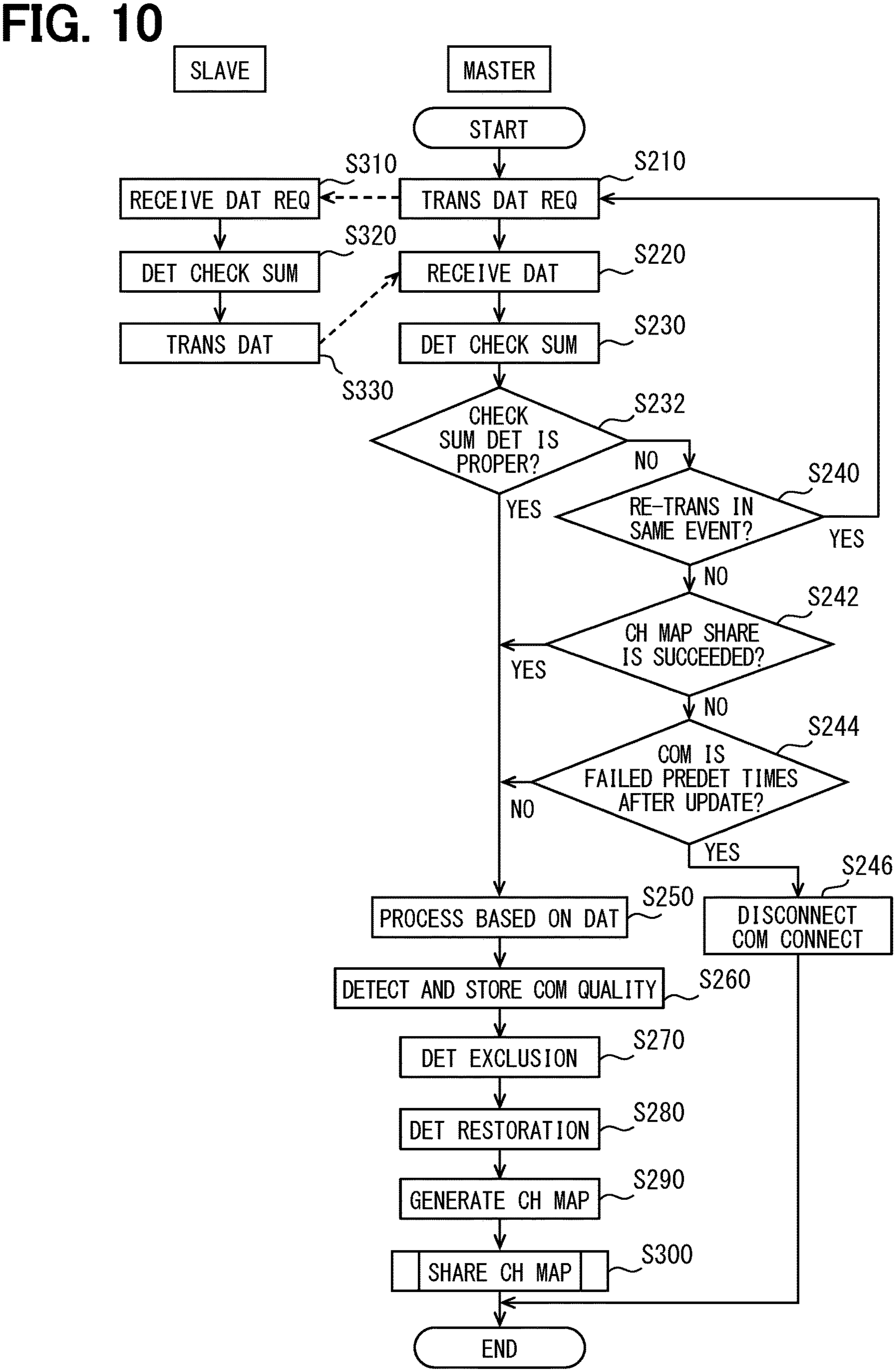
FIG. 10 is a flowchart showing an example of a communication sequence between the master device and the slave device according to the second embodiment.

In order to realize the disconnection of the communication connection at the timing described above, the wireless communication system 10 according to the second embodiment executes the communication sequence shown in the flowchart of FIG. 10 while using the new channel map. The communication sequence shown in the flowchart of FIG. 10 has steps S232, S242, S244, and S246 added to the communication sequence of the first embodiment shown in the flowchart of FIG. 5.

In the flowchart of FIG. 10, in step S232, it is determined whether the check sum determination was OK or NG based on the check sum determination result in step S230. If the check sum determination is OK, it is considered that the master device 20 and the slave device 30 normally transmit and receive a data request and a data response through the processes of steps S210 and S310 using the new channel map, and the processes of steps S220 and S330. Therefore, if the check sum determination is determined to be OK in step S232, the master device 20 proceeds to step S250 and continues the communication with the slave device 30 using the new channel map.

On the other hand, if the check sum determination is NG in step S232, the master device 20 proceeds to step S240. In step S240, similarly to the first embodiment, it is determined whether or not to perform retransmission processing within the same communication event. In step S240, when the master device 20 determines to perform retransmission, the master device 20 executes the process from step S210 again. If it is determined in step S240 not to perform retransmission, the master device 20 proceeds to step S242.

In step S242, the master device 20 determines whether the sharing of the new channel map between the master device 20 and the slave device 30 has been succeeded within the immediately previous channel map update period. More specifically, immediately before the start of the channel map update period in which the new channel map is applied, the master device 20 determines based on the value of the map sharing counter in the flowchart of FIG. 8 whether the sharing of the new channel map has been succeeded within the immediately previous channel map update period, and stores the determination result. Then, in step S242, the master device 20 determines whether or not the sharing of the new channel map has been succeeded based on the stored determination result. If it is determined that the sharing of the new channel map has been succeeded within the immediately previous channel map update period, the master device 20 proceeds to step S250 and continues the communication with the slave device 30. Here, if the master device 20 cannot perform data communication normally a predetermined number of times (corresponding to the third predetermined number of times) in succession, the master device 20 disconnects the communication connection. On the other hand, if it is determined that the sharing of the new channel map has not been succeeded within the immediately previous channel map update period, the master device 20 proceeds to step S244. In step S244, after updating the channel map to the new channel map, it is determined whether the communication with the slave device 30 has failed a predetermined number of times (corresponding to the second predetermined number of times). At this time, if it is determined that the communication with the slave device 30 has failed a predetermined number of times, the master device 20 proceeds to step S246. In step S246, the master device 20 disconnects the communication connection with the slave device 30.

Here, after updating to a new channel map, if the communication with the slave device 30 is succeeded even once, the process of steps S242, S244, and S246 may be skipped. Alternatively, even if the channel maps of the master device 20 and the slave device 30 are different, there may be a possibility that the communication will be successful by chance, so that the process of steps S242, S244, and S246 may be performed.

Although embodiments of the present disclosure have been described above, the present disclosure is not limited to the above-described embodiments, and various modifications can be made without departing from the spirit of the present disclosure.

For example, in each of the embodiments described above, if the sharing of the channel map between the master device 20 and the slave device 30 is not succeeded, the master device 20 is configured to transmit a channel map to the slave device 30 at all of the communication events (i.e., "channel event"=1 to 6) in the channel map update period.

Alternatively, in the channel map update period, the upper limit number of times (corresponding to the first predetermined number of times) for transmitting the channel map from the master device 20 to the slave device 30 may be set smaller than the scheduled number of communication events between the master device 20 and the slave device 30 from the start of sharing the channel map to the start to use the channel map, that is, the number of communication events included in the channel map update period. Then, when it is determined that the sharing of the channel map has never been succeeded although the number of times the channel map is transmitted from the master device 20 to the slave device 30 reaches the upper limit number of times (corresponding to the first predetermined number of times), the master device 20 may disconnect the communication connection with the slave device 30 at the timing (corresponding to the third timing) determined that the sharing of the channel map has never been succeeded.

Figure 11:
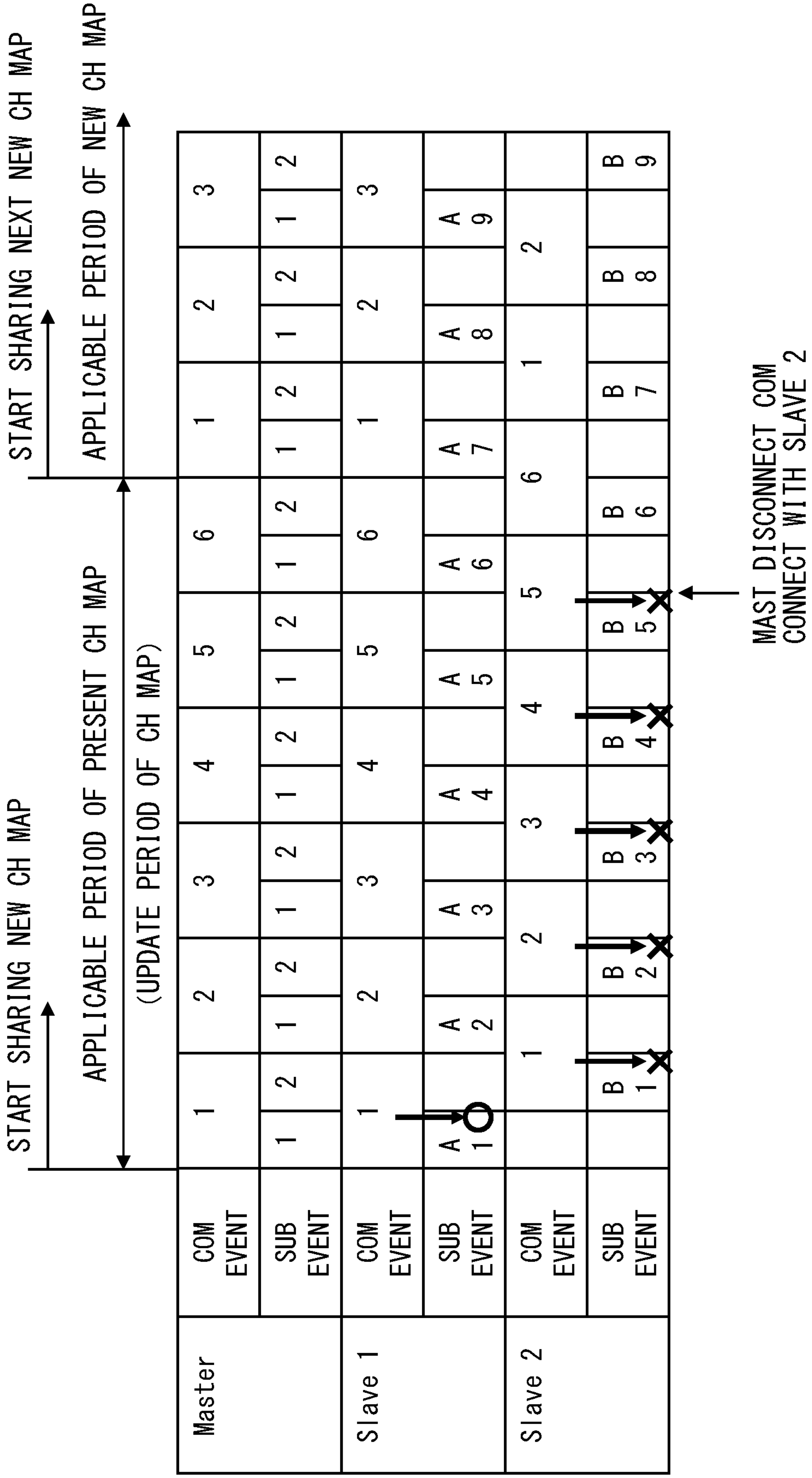
FIG. 11 is a flowchart showing an example of a communication sequence between the master device and the slave device according to a modification.

For example, in the example shown in the time chart of FIG. 11, the master device 20 disconnects the communication connection with the slave device 30 at the timing when it is determined that the sharing of the channel map has failed five times, which is less than the number of communication events (i.e., six times) during the channel map update period. If the sharing of the new channel map is not succeeded, it is unlikely that communication between the master device 20 and the slave device 30 will be succeeded during the application period (i.e., the next channel map update period) in which the new channel map is applied. Therefore, in this modification, the communication connection is disconnected at an earlier timing than, for example, when the communication connection is disconnected after waiting for the start of the next channel map update period. Thereby, early reconnection between the master device 20 and the slave device 30 can be achieved. As a result, it becomes possible to shorten the period during which the communication between the master device 20 and the slave device 30 is interrupted due to mismatch in channel maps. As a result, for example, when at least one of the master device 20 and the slave device 30 is mounted in a vehicle, it is possible to shorten the period during which important communications between the master device 20 and the slave device 30 cannot be performed in the vehicle, such as a communication for notifying that an anomaly has occurred in the in-vehicle device, a communication for commanding important control of the in-vehicle device, and the like. Here, the above-mentioned upper limit number of times may be set less than the number of communication errors in data communication (i.e., the number of times corresponding to the third predetermined number of time) at which the master device 20 disconnects the communication connection with the slave device 30.

Further, in the second embodiment described above, the number of retransmissions of the channel map may be set less than the number of communication events included in the channel map update period, and in a communication event in which a channel map is not transmitted, the master device 20 may perform other processing (e.g., generating process of the next new channel map for the slave device 30 with which the communication connection is maintained). For example, in the example shown in the time chart of FIG. 9, the master device 20 may not retransmit the channel map to the slave device 20 of "Slave 2" at the sixth communication event, and perform other processing at the sixth communication event. Thereby, the processing resources of the master device 20 can be assigned to other processing.

The present disclosure discloses multiple technical ideas listed below and multiple combinations thereof. The following combination of technical features applies not only to the wireless communication system 10 but also to the wireless communication method and the wireless communication program.

(First Technical Feature)

A wireless communication system executes a wireless communication between a master device and a slave device using a communication channel, which is sequentially selected from multiple communication channels.

The wireless communication system includes: at least one processor; and at least one memory storing computer program code.

The at least one memory and the computer program code are configured, with the at least one processor, to cause the wireless communication system to provide:

- a quality determination unit that determines a communication quality of each of the communication channels when the master device wirelessly communicates with the slave device;
- a communication channel determination unit that determines the communication channel to be used for the wireless communication based on a determination result of the communication quality of each of the communication channels by the quality determination unit;
- a channel map share unit that causes the master device to transmit a channel map indicating the communication channel determined by the communication channel determination unit to the slave device, and shares the channel map between the master device and the slave device;
- a share determination unit that determines whether or not the channel map is shared between the master device and the slave device based on a reception result of a channel map reception acknowledgement signal transmitted from the slave device in response to receiving the channel map; and
- a communication disconnection unit that disconnects the communication connection with the slave device by the master device.

The channel map share unit repeats transmitting the channel map when the share determination unit does not determine that sharing of the channel map has been succeeded even though the channel map has been transmitted.

The communication disconnection unit disconnects the communication connection with the slave device at a predetermined timing when the share determination unit has not determined that the sharing of the channel map has been succeeded even though a numerical number of times the channel map has been transmitted by the channel map share unit has reached a first predetermined number of times.

(Second Technical Feature)

In the wireless communication system according to the first technical feature, the channel map share unit transmits, together with the channel map, information indicating a timing to start using the channel map.

The predetermined timing corresponds to a first timing for starting using the channel map.

(Third Technical Feature)

In the wireless communication system according to the first technical feature, the channel map share unit transmits, together with the channel map, information indicating a timing to start using the channel map.

The master device executes communication with the slave device on a communication channel selected according to the channel map transmitted to the slave device at the timing when the master device starts using the channel map. The predetermined timing corresponds to a second timing that the master device determines that communication with the slave device is not possible even after the communication is attempted a second predetermined number of times.

(Fourth Technical Feature)

In the wireless communication system according to the third technical feature, the master device continues to communicate with the slave device via a communication channel that is sequentially selected according to the channel map transmitted to the slave device when the master device is able to communicate with the slave device within the second predetermined number of times the communication is attempted.

(Fifth Technical Feature)

In the wireless communication system according to the third or fourth technical feature, the master device executes to communicate with the slave device via a communication channel that is sequentially selected according to the channel map transmitted to the slave device at a timing of starting to use the channel map when the share determination unit determines that the channel map is shared. The communication disconnection unit disconnects the communication connection with the slave device when the communication with the slave device is not possible even though the communication with the slave device is performed a third predetermined number of times, which is greater than the second predetermined number of times.

(Sixth Technical Feature)

In the wireless communication system according to the first technical feature, the channel map share unit transmits, together with the channel map, information indicating a timing to start using the channel map.

The first predetermined number of times is set to be smaller than a scheduled number of times of communication between the master device and the slave device before starting to use the channel map.

The predetermined timing corresponds to a third timing that the share determination unit has not determined that the sharing of the channel map has been succeeded even though a numerical number of times the channel map has been transmitted by the channel map share unit has reached the first predetermined number of times.

(Seventh Technical Feature)

In the wireless communication system according to any one of the first to sixth technical features, the master device attempts to reconnect the wireless communication with the slave device when the communication connection with the slave device is s disconnected by the communication disconnection unit. Communication channel information used for the wireless communication is shared between the master device and the slave device in a reconnection process.

(Eighth Technical Feature)

In the wireless communication system according to any one of the first to seventh technical features, the master device communicates with a plurality of slave devices at a same period.

The communication disconnection unit disconnects, at the predetermined timing, the wireless communication with one of the slave devices that is deemed not to be able to share the channel map among the plurality of slave devices.

(Ninth Technical Feature)

In the wireless communication system according to any one of the first to eighth technical features, the communication channel determination unit periodically updates the communication channel used for the wireless communication based on the determination result of the communication quality of each of the communication channels by the quality determination unit.

The channel map share unit causes the master device to periodically transmit an updated channel map indicating an updated communication channel to the slave device, and shares the updated channel map between the master device and the slave device.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause wireless communication system to perform functions" should be understood that (i) only the circuit can cause wireless communication system to perform all the functions, (ii) only the processor can cause wireless communication system to perform all the functions, or (iii) the circuit can cause wireless communication system to perform at least one of the functions and the processor can cause wireless communication system to perform the remaining functions. For instance, in the case of the above-described (iii), function A and B among the functions A to C may be implemented by a circuit, while the remaining function C may be implemented by a processor."

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A wireless communication system for executing a wireless communication between a master device and at least one slave device using a communication channel, which is sequentially selected from a plurality of communication channels, the wireless communication system comprising:

a quality determination unit that determines a communication quality of each of the communication channels when the master device wirelessly communicates with the at least one slave device;

a communication channel determination unit that determines the communication channel to be used for the wireless communication based on a determination result of the communication quality of each of the communication channels by the quality determination unit;

a channel map share unit that causes the master device to transmit a channel map indicating the communication channel determined by the communication channel determination unit to the at least one slave device, and shares the channel map between the master device and the at least one slave device;

a share determination unit that determines whether or not the channel map is shared between the master device and the at least one slave device based on a reception result of a channel map reception acknowledgement signal transmitted from the at least one slave device in response to receiving the channel map; and a communication disconnection unit that disconnects communication connection with the at least one slave device by the master device, wherein:

the channel map share unit repeats transmitting the channel map when the share determination unit does not determine that sharing of the channel map has been succeeded even though the channel map has been transmitted; and the communication disconnection unit disconnects the communication connection with the at least one slave device at a predetermined timing when the share determination unit determines that the sharing of the channel map has never been succeeded even though a numerical number of times that the channel map has been transmitted by the channel map share unit has reached a first predetermined number of times.

2. The wireless communication system according to claim 1, wherein:

the channel map share unit transmits, together with the channel map, information indicating a first timing to start using the channel map; and the predetermined timing corresponds to the first timing for starting using the channel map.

3. The wireless communication system according to claim 1, wherein:

the channel map share unit transmits, together with the channel map, information indicating a first timing to start using the channel map; and the master device executes the wireless communication with the at least one slave device on the communication channel selected according to the channel map transmitted to the at least one slave device at the first timing when the master device starts using the channel map; and the predetermined timing corresponds to a second timing that the master device determines that the wireless communication with the at least one slave device is not possible even after the wireless communication is attempted a second predetermined number of times.

4. The wireless communication system according to claim 3, wherein:

the master device continues to communicate with the at least one slave device via the communication channel that is sequentially selected according to the channel map transmitted to the at least one slave device when the master device is able to communicate with the at least one slave device within the second predetermined number of times that the wireless communication is attempted.

5. The wireless communication system according to claim 3, wherein:

the master device executes to communicate with the at least one slave device via the communication channel that is sequentially selected according to the channel map transmitted to the at least one slave device at the first timing of starting to use the channel map when the share determination unit determines that the channel map is shared; and the communication disconnection unit disconnects the communication connection with the at least one slave device when the wireless communication with the at least one slave device is not possible even though the wireless communication with the at least one slave device is performed a third predetermined number of times, which is greater than the second predetermined number of times.

6. The wireless communication system according to claim 1, wherein:

the channel map share unit transmits, together with the channel map, information indicating a first timing to start using the channel map; and the first predetermined number of times is set to be smaller than a scheduled number of times of the wireless communication between the master device and the at least one slave device before starting to use the channel map; and the timing corresponds to a third timing that the share determination unit determines that the sharing of the channel map has never been succeeded even though a numerical number of times that the channel map has been transmitted by the channel map share unit has reached the first predetermined number of times.

7. The wireless communication system according to claim 1, wherein:

the master device attempts to reconnect the wireless communication with the at least one slave device when the communication connection with the at least one slave device is disconnected by the communication disconnection unit; and communication channel information used for the wireless communication is shared between the master device and the at least one slave device in a reconnection process.

8. The wireless communication system according to claim 1, wherein:

the at least one slave device includes a plurality of slave devices;

the master device communicates with the plurality of slave devices at a same period; and the communication disconnection unit disconnects, at the predetermined timing, the wireless communication with one of the plurality of slave devices that is deemed not to be able to share the channel map among the plurality of slave devices.

9. The wireless communication system according to claim 1, wherein:

the communication channel determination unit periodically updates the communication channel used for the wireless communication based on the determination result of the communication quality of each of the communication channels by the quality determination unit; and the channel map share unit causes the master device to periodically transmit an updated channel map indicating an updated communication channel to the at least one slave device, and shares the updated channel map between the master device and the at least one slave device.

10. The wireless communication system according to claim 1, further comprising:

at least one of (i) a circuit and (ii) a processor having a memory storing computer program code, wherein:

the at least one of the circuit and the processor having the memory is configured to cause the wireless communication system to provide at least one of: the quality determination unit; the communication channel determination unit; the channel map share unit; the share determination unit; and the communication disconnection unit.

11. A wireless communication method for executing a wireless communication between a master device and at least one slave device using a communication channel, which is sequentially selected from a plurality of communication channels, the wireless communication method comprising:

a quality determination step for determining a communication quality of each of the communication channels when the master device wirelessly communicates with the at least one slave device;

a communication channel determination step for determining the communication channel to be used for the wireless communication based on a determination result of the communication quality of each of the communication channels in the quality determination step;

a channel map share step for causing the master device to transmit a channel map indicating the communication channel determined in the communication channel determination step to the at least one slave device, and sharing the channel map between the master device and the at least one slave device;

a share determination step for determining whether or not the channel map is shared between the master device and the at least one slave device based on a reception result of a channel map reception acknowledgement signal transmitted from the at least one slave device in response to receiving the channel map; and a communication disconnection step for disconnecting communication connection with the at least one slave device by the master device, wherein:

in the channel map share step, transmission of the channel map is repeated when not determining in the share determination step that the channel map is shared even though the channel map has been transmitted; and in the communication disconnection step, the communication connection with the at least one slave device is disconnected at a predetermined timing when determining in the share determination step that the sharing of the channel map has never been succeeded even though a numerical number of times the channel map has been transmitted in the channel map share step has reached a first predetermined number of times.

12. A non-transitory tangible computer readable storage medium comprising instructions being executed by at least one processor for causing a master device to wirelessly communicate with at least one slave device via a communication channel sequentially selected from a plurality of communication channels, when executing the instructions, at least one processor providing:

a quality determination function for determining a communication quality of each of the communication channels when the master device wirelessly communicates with the at least one slave device;

a communication channel determination function for determining the communication channel to be used for wireless communication based on a determination result of the communication quality of each of the communication channels by the quality determination function;

a channel map share function for causing the master device to transmit a channel map indicating the communication channel determined by the communication channel determination function to the at least one slave device, and sharing the channel map between the master device and the at least one slave device;

a share determination function for determining whether or not the channel map is shared between the master device and the at least one slave device based on a reception result of a channel map reception acknowledgement signal transmitted from the at least one slave device in response to receiving the channel map; and a communication disconnection function for disconnecting communication connection of the master device with the at least one slave device, wherein:

the channel map share function repeats transmission of the channel map when not determining by the share determination function that the channel map is shared even though the channel map has been transmitted; and the communication connection with the at least one slave device is disconnected at a predetermined timing by the communication disconnection function when determining by the share determination function that the sharing of the channel map has never been succeeded even though a numerical number of times the channel map has been transmitted by the channel map share function has reached a first predetermined number of times.

* * * * *